US006633656B1

(12) United States Patent
Picard (10) Patent No.: US 6,633,656 B1
(45) Date of Patent: Oct. 14, 2003

(54) MICROTHERMISTOR BASED FINGERPRINT SENSOR

(75) Inventor: Francis Picard, Ste-Foy (CA)

(73) Assignee: Institut National d'Optique, Quebec (CA)

( * ) Notice: Subject to any disclaimer, the term of this patent is extended or adjusted under 35 U.S.C. 154(b) by 641 days.

(21) Appl. No.: 09/595,999

(22) Filed: Jun. 16, 2000

Related U.S. Application Data (60) Provisional application No. 60/171,656, filed on Dec. 27, 1999.

(30) Foreign Application Priority Data

Dec. 24, 1999  (CA) .............................................. 2293118

(51) Int. Cl.[7] ................................................. G06K 9/00
(52) U.S. Cl. ...................... 382/124; 382/125; 340/5.53
(58) Field of Search ................................ 382/124, 125, 382/126, 127; 374/163, 178; 340/5.53; 250/338.4; 73/862.046; 257/522

(56) References Cited

U.S. PATENT DOCUMENTS

| 3,781,855 A | 12/1973 | Killen ................. 340/146.3 E |
| 4,353,056 A | 10/1982 | Tsikos ................. 340/146.3 E |
| 4,394,773 A | 7/1983 | Ruell ............................ 382/4 |
| 4,429,413 A | * 1/1984 | Edwards ..................... 382/124 |
| 4,577,345 A | 3/1986 | Abramov ....................... 382/4 |
| 5,325,442 A | 6/1994 | Knapp ........................... 382/4 |
| 5,400,662 A | 3/1995 | Tamori ................... 73/862.046 |
| 5,548,394 A | 8/1996 | Giles et al. ................... 356/71 |
| 5,745,046 A | 4/1998 | Itsumi et al. .......... 340/825.31 |
| 5,831,266 A | 11/1998 | Jerominek et al. ....... 250/338.4 |
| 5,844,287 A | 12/1998 | Hassan et al. .............. 257/419 |
| 5,892,599 A | 4/1999 | Bahuguna .................... 359/15 |
| 5,920,384 A | 7/1999 | Borza .......................... 356/71 |
| 5,937,557 A | 8/1999 | Bowker et al. ............ 42/70.01 |
| 5,940,526 A | 8/1999 | Setlak et al. ................ 382/124 |
| 5,953,441 A | 9/1999 | Setlak et al. ................ 382/124 |
| 5,962,909 A | 10/1999 | Jerominek et al. .......... 257/522 |

FOREIGN PATENT DOCUMENTS

| EP | 0840250 | 5/1998 |
| FR | 2736179 | 1/1997 |
| WO | WO 9632061 | 10/1996 |

OTHER PUBLICATIONS

Ji–Song Han et al.(Proc. IEEE 1999 International Symposium on Micromechatronics and Human Science 6/99 pp. 199–205.*

* cited by examiner

Primary Examiner—Bhavesh M. Mehta
Assistant Examiner—Ali Bayat
(74) Attorney, Agent, or Firm—Merchant & Gould P.C.

(57) ABSTRACT

The present invention concerns a fingerprint sensor which is small; demonstrates high sensitivity, low power consumption, high data acquisition rate and is insensitive to vibration and pressure. The sensor produces a high contrast fingerprint representation and is not subject to repeated deformation which could potentially reduces its lifetime. The fingerprint sensor has a microthermistor array for converting temperature variation into an electrical signal, the array being composed of a plurality of microthermistors, each of the thermistors being adapted to output an electrical signal proportional to a temperature variation; a read-out integrated circuit operatively connected to the microthermistor array for receiving the electrical signal and converting it into an electronic output signal representative of the ridge and valley structure of a finger; and a substrate for supporting the read-out integrated circuit and the microthermistor array. The invention is based on microthermistor array. The ohmic resistance of these sensors varies strongly with temperature. The parameter directly measured in this case is the temperature-induced resistance variation of each individual microthermistor. Signals from each of the microthermistor part of the array represent the fingerprint pattern.

21 Claims, 7 Drawing Sheets

|  | 17 |  | 21 |
|  | 15 |  | 23 |
|  | 27 |  | 25 |

MICROTHERMISTOR BASED FINGERPRINT SENSOR

This application claims benefit of provisional application No. 60/171,656 filed Dec. 27, 1999.

FIELD OF THE INVENTION

The present invention relates to a microthermistor based fingerprint sensor.

DESCRIPTION OF THE PRIOR ART

Finger tips of human beings exhibit a pattern of ridges and valleys called a fingerprint. This structure is unique to every human being and has long been used for the identification of a person. Of particular interest are the ridge branching and ending points of the structure. These fingerprint features are called minutiae. The position and orientation of the minutiae can be used to characterise a fingerprint and thus minimise the information that has to be stored and processed for identification purposes, while still keeping an accurate fingerprint representation.

Fingerprint identification can be a time consuming activity when performed by human operators. This explains why automation of fingerprint identification has received considerable attention. Automated fingerprint identification requires the implementation of two main functions. First, the fingerprint pattern of ridges and valleys must be translated into an electronic format representative of the fingerprint pattern. This can be achieved through the use of various sensor types and arrangements. The fingerprint electronic representation can then be stored in a memory, if convenient, for further analysis. Second, the electronic data must be processed in order to achieve recognition. Various algorithms have been used for this purpose in the past. Some of them are based on a 2-dimensional representation of the fingerprint while others are based on a 1-dimensional fingerprint representation (see, for example, U.S. Pat. No. 5,745,046). Often, these algorithms make use of minutiae to characterise a fingerprint.

Advances in microelectronics and micro-machining have allowed substantial miniaturisation of fingerprint identification systems, which open a wide application range for these devices. They can be integrated to cars and houses as a replacement for keys and locks. They can be used to control access to high security areas. Fingerprint identification systems can replace Personal Identification Numbers (PINs) and ATM cards. They could also be placed in devices like cellular phones, computers or firearms to prevent unauthorised use of the same. Finally, law enforcement forces can bring them in the field as a very powerful tool for real-time identification of a person.

Historically, the first medium used for fingerprint recording was ink on paper. This process does not provide a good resolution and is not very convenient for users, as it involves the use of ink on a finger, which is then transferred to a piece of paper. After having placed the fingerprint on the piece of paper, the user must clean off the ink, which makes the process messy. Moreover, using these records for fingerprint identification is a very cumbersome and time consuming process.

Many optical systems have been implemented for fingerprint recording (see, for example, U.S. Pat. Nos. 5,548,394, 5,937,557, 5,892,599 and 5,920,384). Generally, an image of the fingerprint is projected on a 2D detector array or is scanned on a 1D detector array. Optical arrangements used to produce this image are very diverse and can make use, for example, of optical fiber bundles (U.S. Pat. No. 5,937,557), holographic optical elements (U.S. Pat. No. 5,892,599) or mini-prism arrays (U.S. Pat. No. 5,920,384). Some approaches take advantage of Frustrated Total Internal Reflection (FTIR) to enhance the contrast between the fingerprint ridges and valleys (U.S. Pat. No. 5,548,394). In these systems, the finger to be identified is typically pressed against a prism which provides the required FTIR. One operational drawback of this approach is that the optical surfaces in contact with the finger must be cleaned regularly to maintain the system performance. Moreover, such systems are typically large and the alignment of the various optical components part of the system must be kept within tight tolerances.

Other fingerprint identification systems sense the distribution of some electrical properties representative of the finger skin pattern. In some cases, the sensor is a micro-switch array (U.S. Pat. No. 3,781,855). The skin being an electrical conductor, direct contact of the fingerprint ridges with the micro-switches closes a circuit. Micro-switches of the array beneath fingerprint valleys remain opened. The pattern of closed and open switches in the array provides a representation of the fingerprint structure. Reading of this pattern is achieved through an integrated circuit, which is part of the micro-switch array chip. A variation of this approach involves measurements of the skin electrical resistance instead of simple switch state reading. It is therefore possible to evaluate to which extent the finger is in contact with various points of the underlying chip. This allows a better resolution of the transition zone between ridges and valleys and the fingerprint representation obtained is more accurate.

Other systems measure the capacitance between the finger skin and microelectrodes, as described for example in U.S. Pat. No. 5,325,442. In this approach, the finger skin is one of the capacitor plates and the microelectrode is the other capacitor plate. The value of this capacitance is a function of the distance between the finger skin and the electrode. When the finger is placed on a microelectrode array, the capacitance variation pattern measured from electrode to electrode gives a mapping of the distance between the finger skin and the various microelectrodes underneath. This corresponds to the ridge and valley structure on the finger tip. Here again, the parameter of importance, i.e. the capacitance, is read using a integrated circuit fabricated on the same substrate as the microelectrode array. More recent systems involve measurement of the finger skin equivalent complex impedance as part of a read-out circuit (U.S. Pat. No. 5,953,441) instead of simply measuring the ohmic resistance or the capacitance as described above.

Finally, fingerprint recording devices, closely related to the capacitance measurement systems described above, make use of electric field sensor array in order to obtain the fingerprint representation (U.S. Pat. No. 5,940,526).

Another category of fingerprint reading systems relies on pressure sensor arrays. In this case, various mechanisms are used to measure the pressure applied by the finger tip at different points of the sensor array. For points where a fingerprint ridge is in contact with a sensor, the pressure is high, while it is null for sensors underneath fingerprint valleys. The sensing mechanisms used here are very diverse. Some systems are based on micro-switch arrays (as described in U.S. Pat. Nos. 4,577,345 and 5,400,662). The state of the individual micro-switches (on or off) depends on the amount of pressure applied on them. Implementation of this approach is often done using a thin membrane which is electrically conductive or has a conductive layer on its side facing the switch array. This membrane must be soft enough so it takes the fingerprint shape when pressed by the finger against the switch array. Membrane points corresponding to fingerprint ridges touch the sensor array and close the underlying switches. For the membrane points corresponding to fingerprint valleys, the micro-switches remain in the off state. The main disadvantage of this approach is that it is very demanding on the membrane properties, as it must be conductive (at least partially), very soft and yet capable of withstanding repeatedly the deformations induced by a user's finger. An improved version of this system, as described in U.S. Pat. No. 5,844,287, makes use of an array of micro-membranes instead of a single membrane. One micro-membrane is fabricated over each micro-switch in the array. When a fingerprint ridge touches a micro-membrane, it brings it into contact with the underlying circuit which closes the associated micro-switch. This approach is less demanding on the membrane material, as the micro-membrane deformation can be made smaller.

For the fingerprint recording systems based on pressure sensor arrays described above, the transition zone between ridges and valleys is very sharp as the sensor signal is binary. This can cause some inaccuracy on the recorded fingerprint feature size and position. Other pressure sensor types can be used to avoid such problems. For example, pressure sensors based on capacitance readings can achieve grey levels in fingerprint representations (see U.S. Pat. Nos. 4,353,056 and 5,844,287).

These sensors typically include a compressible dielectric layer sandwiched between two electrodes. When pressure is applied to the top electrode, the inter-electrode distance changes, which modifies the capacitance associated with this structure. The higher the pressure applied, the larger the sensor capacitance gets. Arrays of such sensors combined with a read-out integrated circuit can be used for fingerprint acquisition. When a finger is brought into contact with such an array, fingerprint ridges correspond to the highest pressure point, while no pressure is applied at points associated with the fingerprint valleys. A whole range of intermediate pressures can be read for the transition zone between fingerprint ridge and valleys. This feature allows a grey level fingerprint representation which is more accurate than simple black and white recording. If the compressible dielectric material mentioned above is replaced by a compressible material exhibiting a relatively good electrical conductivity, the system concept described above can still be used but here, the sensor electrical resistance is read instead of the sensor capacitance (this solution is investigated in U.S. Pat. No. 5,745,046). This last system design still allows the grey level representation of fingerprints but has the disadvantages of consuming more energy.

Other systems take advantage of the fact that when a finger is pressed against a surface, the pressure is at a maximum at points corresponding to fingerprint ridges, null at points associated with fingerprint valleys and has intermediate values in the transition zone between ridges and valleys. In some cases, arrays of sensors made of piezoelectric material are used (see U.S. Pat. No. 4,394,773 and French application no. FR 2736179-A1). These sensors produce a voltage which is function of the pressure applied on them. The voltage spatial distribution in the sensor array gives a grey level fingerprint representation. In other systems, each sensing cell comprises a transistor whose operating point is a function of the pressure applied to the cell. The transistor operating point is affected either by direct influence of the pressure on the transistor or through modification of the properties of an electrical component sensitive to pressure and part of the circuit establishing the transistor operating point. The distribution pattern of the transistor operating point through the sensing cell array provides a mapping of the pressure field generated by the finger on the chip. As was already mentioned above, this pressure field gives an accurate representation of the fingerprint.

The spatial distribution of the thermal conductivity between a finger tip and a substrate against which it is pressed has also been used to obtain fingerprint representation in electronic format (see international application no. WO 96132061). For this type of system, a sensor array is heated and the heat exchange between the finger and the underlying sensors is monitored through a sensor temperature variation measurement. A large change in the sensor temperature indicates a large heat exchange between the considered sensor and the finger at this point. Large heat exchanges, in turn, correspond to high thermal conductivity points for which the thermal contact between the finger and the sensor is very good. Following this approach, the highest thermal conductivity points map the fingerprint ridges structure, the lowest thermal conductivity points give the fingerprint valleys pattern and intermediate thermal conductivity points correspond to the transition zone between ridges and valleys.

As for most of the systems described above, the data reading from the sensor array is performed by an integrated circuit part of the substrate on which the sensor array is fabricated. The main drawback of using the thermal conductivity as the parameter for fingerprint recording is that the sensors must be heated and, ideally, this heating should be done separately for each individual sensor.

Finally, one category of fingerprint reading systems is based on temperature sensor arrays. In this particular case, the equilibrium temperature of each sensor is function of the thermal contact between the finger and the sensor. A good thermal contact, corresponding to fingerprint ridges, will typically induce a larger sensor temperature change than a bad thermal contact. The sensors for which the temperature remains unaffected by the finger contact, at least for some amount of time, correspond to fingerprint valleys. The system implementations reported include sensor made of pyroelectric material (EP 0840250-A1). In this case, sensor temperature change generates an electric charge within the sensor. The charge pattern within the array can be read using the appropriate circuit, similar to the one used in CCD cameras. As the charge generated within a sensor depends on the temperature change experienced by this sensor, a representation of the temperature field on the sensor array is obtained. This temperature field is directly related to the fingerprint structure as was mentioned above. The problem with this approach is that the charge pattern representing the fingerprint will quickly fade away if the temperature change is not regularly refreshed. This is why this particular system requires the sensors to be pulse-heated repeatedly, which constantly recreates the temperature transient necessary for the system operation.

Another approach to avoid this problem consists in sweeping the fingerprint across a array of such pyroelectric sensors which generates temperature transients as well. However, this method requires more elaborated data processing algorithms to retrieve the fingerprint representation. Moreover, it is much more demanding on the sensor response time and on the system data acquisition rate. In other systems based on temperature sensor arrays, each sensing cell comprises a transistor whose operating point is function of the cell temperature (U.S. Pat. No. 4,429,413).

The transistor operating point is affected either by direct influence of the transistor temperature or through modification of the properties of an electrical component sensitive to temperature and part of the circuit establishing the transistor operating point. The distribution pattern of the transistor operating point through the sensing cell array provides a mapping of the temperature field generated by the finger on the chip. As was already mentioned above, this temperature field gives an accurate representation of the fingerprint.

A whole range of different approaches to fingerprint recording has been described in the open literature. The classical approach based on ink and paper has proven to be very unpractical and time consuming. Other systems based on optical imaging can achieved good performances but they are typically large and require regular maintenance. A broad family of fingerprint recording devices makes use of a sensor array combined with a read out integrated circuit, both components being fabricated on the same substrate. The parameters measured by the sensors vary greatly. For example, various electrical properties characterising the finger skin pattern have been used as measuring parameters in different fingerprint sensing systems. Ohmic resistance, capacitance, complex impedance and electric fields have all been mentioned as possible parameters in the description of such systems. Other systems are based on pressure sensors (micro-switches, piezoelectric sensors, etc.) These pressure sensor based systems often include membranes or micromembranes that must withstand repeated deformation which can reduce the device lifetime. An Implementation of a fingerprint recording system making use of thermal conductivity sensors has also been described. In this particular system, the sensors must be heated and the heat exchange between individual sensors and the finger skin is monitored through sensor temperature variation measurements. The drawback of this method is the required sensor heating and the associated power consumption. Finally, fingerprint acquisition devices are based on temperature sensor arrays. Some of those use pyroelectric sensors which require pulse heating in order to work properly. Such pulse heating being inconvenient, other systems rely on fingerprint sweeping across a pyroelectric sensor array which provides the temperature transients necessary for such sensors. The disadvantages of this solution are that it involves much more complex fingerprint retrieval algorithm and it is much more demanding on the sensor response time and on the system data acquisition rate. Other implementations of temperature sensitive fingerprint recording devices use transistors as temperature sensor. In this case, the operating point of the various transistors within the sensing cell array varies as a function of temperature either directly or through temperature sensitive electrical components part of the circuit establishing the transistor operating point.

The patents more closely related to the present invention involve temperature or thermal conductivity sensor arrays. In the approach based on a thermal conductivity sensor array, each sensor must be heated. Other patents describe systems based on temperature sensor array. Some of them use pyroelectric sensors which require temperature transients to operate properly.

SUMMARY OF THE INVENTION

It is an object of the present invention to prove a fingerprint sensor which is small; demonstrates high sensitivity, low power consumption, high data acquisition rate and is insensitive to vibration and pressure. The sensor of the present invention produces a high contrast fingerprint representation and is not subject to repeated deformation which could potentially reduces its lifetime. In accordance with the invention, these and other objects are achieved with a fingerprint sensor for transforming the ridge and valley pattern of a finger, hereinafter referred to as a fingerprint, into an electronic output signal, comprising:

(a) a microthermistor array for converting temperature variation into an electrical signal, said array being composed of a plurality of microthermistors, each of said thermistors being adapted to output an electrical signal proportional to a temperature variation;

(b) a read-out integrated circuit operatively connected to said microthermistor array for receiving said electrical signal and converting it into an electronic output signal representative of the ridge and valley structure of a finger; and (c) a substrate for supporting said read-out integrated circuit and said microthermistor array.

The invention described in the present document is based on microthermistor array. The ohmic resistance of these sensors varies strongly with temperature. The parameter directly measured in this case is the temperature-induced resistance variation of each individual microthermistor. Signals from each of the microthermistor part of the array represent the fingerprint pattern.

DESCRIPTION OF THE DRAWINGS

The present invention will be better understood after having read the following description of a preferred embodiment thereof made in reference to the following drawings in which.

DESCRIPTION OF A PREFERRED EMBODIMENT OF THE INVENTION

Figure 1A:
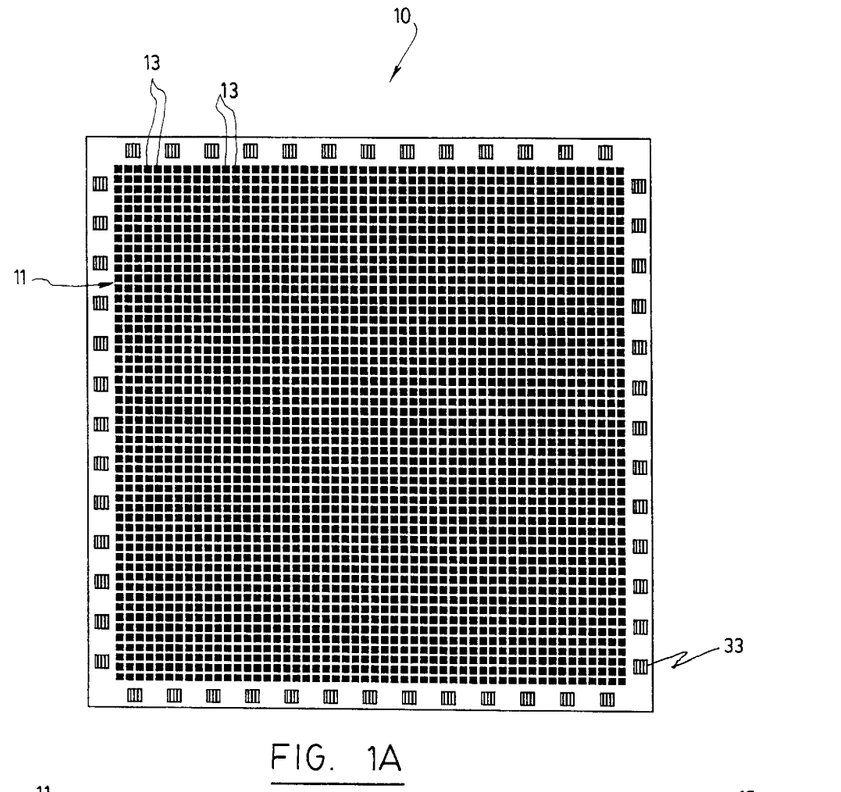
FIGS. 1a and 1b are a schematic top and cross-sectional views, respectively, of a fingerprint sensor according to a preferred embodiment of the invention.
Figure 1B:
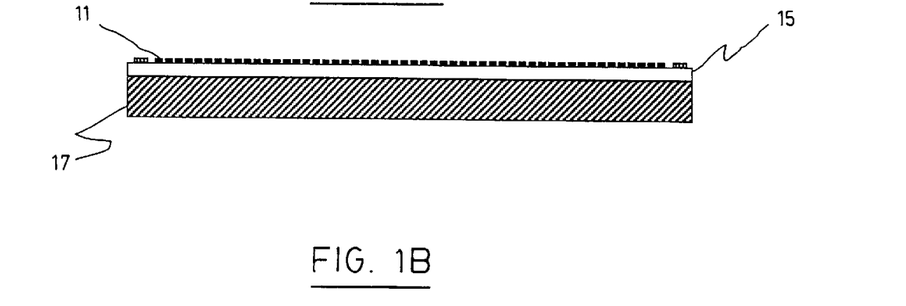

As mentioned previously, the present invention relates to fingerprint sensing, based on a temperature sensing cell array. In broad terms, the fingerprint sensor according to the present invention transforms the ridge and valley pattern of a finger, hereinafter referred to as a fingerprint, into an electronic output signal. Referring now to FIGS. 1a and 1b, the sensor 10 according to the present invention comprises a microthermistor array 11 for converting temperature into an electrical signal, the array 11 being composed of a plurality of microthermistors 13, each of the thermistors 13 being adapted to output an electrical signal proportional to a temperature variation; a read-out integrated circuit 15 operatively connected to the microthermistor array 11 for receiving the electrical signal and converting it into an electronic output signal representative of the ridges and valleys of a finger; and a substrate 17 for supporting the read-out integrated circuit 15 and the microthermistor array 11.

Figure 2:
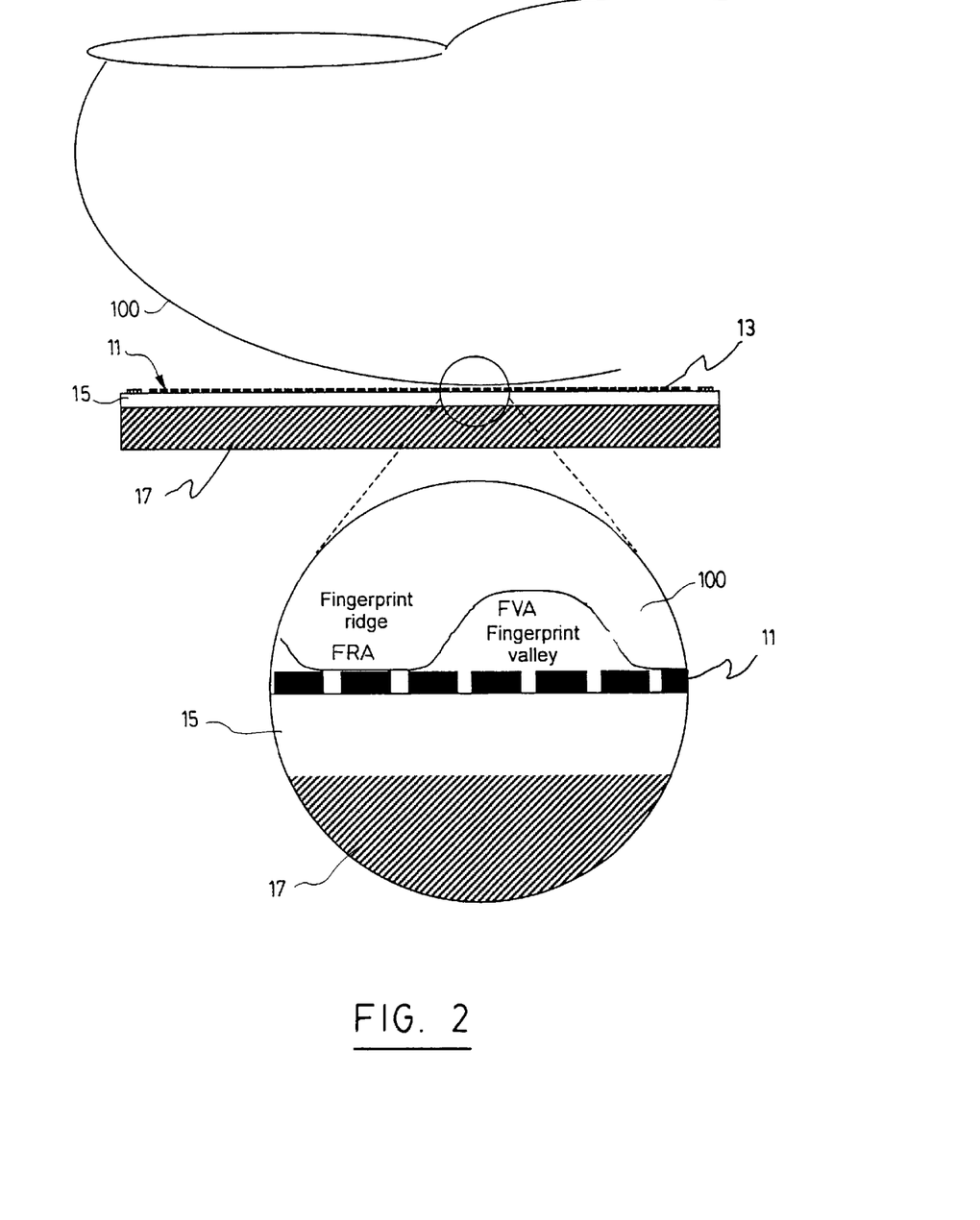
FIG. 2 is a side view of the sensor of FIG. 1, with a finger thereon.

Referring now to FIG. 2, when a finger 100 is brought into contact with the thermistor array 11, the temperature of each individual sensor 13 is modified to some extent, depending on the thermal contact between the finger and the individual sensor 13. The temperature variation of each thermistor 13 translates into an ohmic resistance change which is read by an integrated circuit 15 fabricated on the same substrate as the sensors 13. The temperature field measured using this procedure provides a representation of the fingerprint under investigation.

The structure of the thermistors 13 is such that they can withstand repeated contact with fingers. Their construction can be based, to a large extent, on existing microbolometer fabrication processes developed for infrared imaging applications. The overall system size is relatively small and well suited for a large range of applications.

The microthermistor based fingerprint sensor 10 of the present invention allows the recording of high contrast fingerprint representations. It is compatible with high data acquisition rate in the range of hundreds of kHz. The sensor of the present invention 10 does not require sensor heating or temperature transients. It can be designed to be insensitive to vibrations or pressure by a proper choice of the building materials. The invention makes use of a 2D sensor array 11 which eliminates the need for any mechanical fingerprint scanning.

Referring again to FIG. 2, the contrast in the fingerprint representation is given by sensor temperature difference between areas where the finger 100 touches the temperature sensors 13 (fingerprint ridge area, FRA) and areas not directly in contact with the temperature sensors 13 (fingerprint valley area, FVA). The temperature difference results from different heat exchange mechanisms between the finger 100 and the underlying sensors depending on the area considered (FRA or FVA). In FVA, the main heat transfer mechanism is radiation if the time frame considered is relatively short (<<1 second). This transfer mechanism is not as fast as heat conduction, which is the main heat exchange mechanism in FRA. A temperature contrast results between the FVA and the FRA if the time frame considered is relatively short (<<1 second).

The temperature contrast between sensors 13 eventually vanishes a certain time period after the finger has made contact with the sensors 13. This results from the temperature equilibrium reached after a sufficiently long time period. At this moment, the air in the gap between the FVA and the sensors 13 has been heated to skin temperature and heats in turn the sensors 13 by convection and conduction. These heat transfer mechanisms, combined with radiation, heat the sensors 13 corresponding to the FVA until they eventually reach, approximately, the skin temperature. The sensors 13 beneath the FRA, directly in contact with the skin, are already at skin temperature at this time. The fingerprint signal then disappears as all sensors 13 are at the same temperature.

The time for which the temperature contrast exists between FRA and FVA sensors can be greatly increased by active temperature stabilisation of the sensor substrate 17. This allows to maintain different equilibrium temperatures for the FVA sensors and the FRA sensors. In this case, the temperature contrast between FRA and FVA sensors reaches a steady-state value after a certain time period but does not vanish.

Figure 5A:
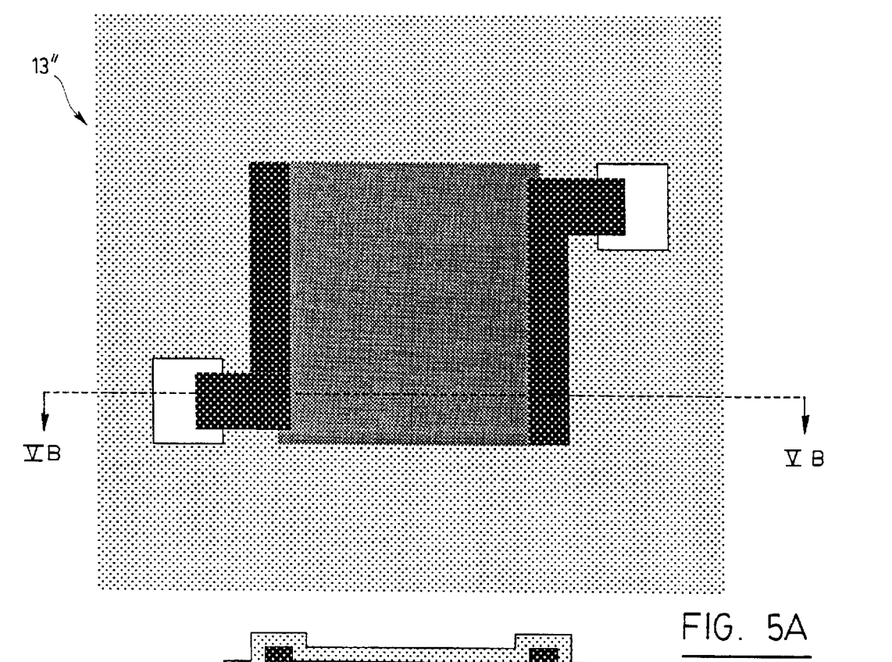
FIGS. 5a and 5b are schematic top and cross-sectional views, respectively, of a thermistor structure according to a second preferred embodiment of the invention.
Figure 5B:
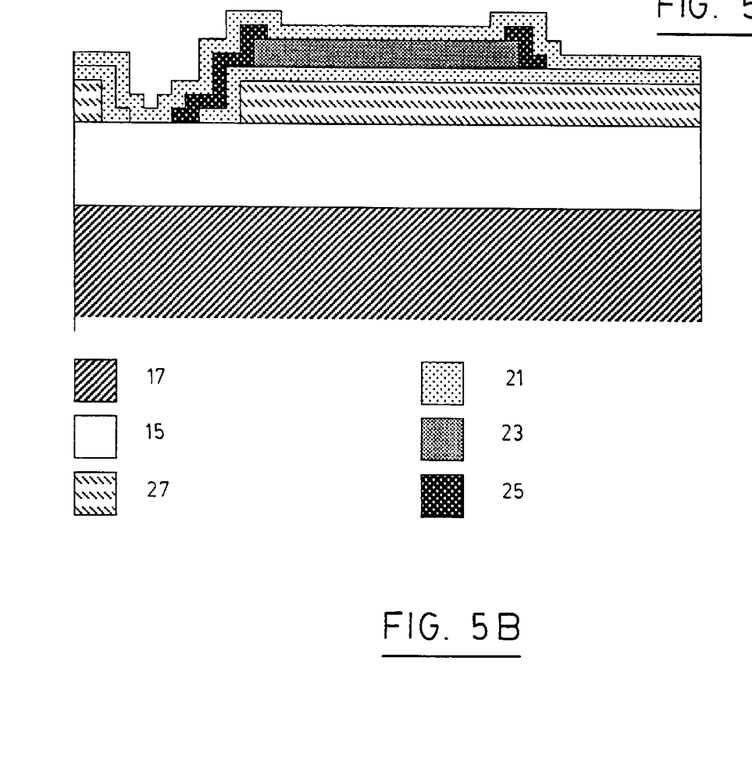

The temperature sensors 13 used for the invention are preferably microthermistors. Typically, these microthermistors 13 comprise a sensitive layer 23, preferably made of vanadium oxide ($VO_x$), a thermal insulation layer 27 preferably made of polyimide and passivation layers 21, preferably made of silicon nitride ($SiN_x$) (see FIG. 5, for example). Generally, the sensitive layer 23 is sandwiched between two passivation layers 21, which provide a good protection against potentially harmful environmental conditions. The sensitive layer 23 is preferably made of a material whose electrical resistivity depends strongly on its temperature (like the vanadium oxide for example) Metallic electrodes 25, preferably made of titanium, connected to the sensitive layer 23 allow measurement of the sensitive layer 23 electrical resistance. The insulation layer 27 thermally insulates (to some extent) the sensitive layer 23 from the substrate 17. This considerably increases the sensitivity of the microthermistor 13. However, for the application contemplated in the present invention, it is not clear that this insulation layer 27 is absolutely necessary, as the temperature contrast to be detected is relatively high. Removing the insulation layer 27 from the microthermistor 13 structure reduces its sensitivity, but if this sensitivity decrease is acceptable for the application, it simplifies the fabrication process.

Figure 3:
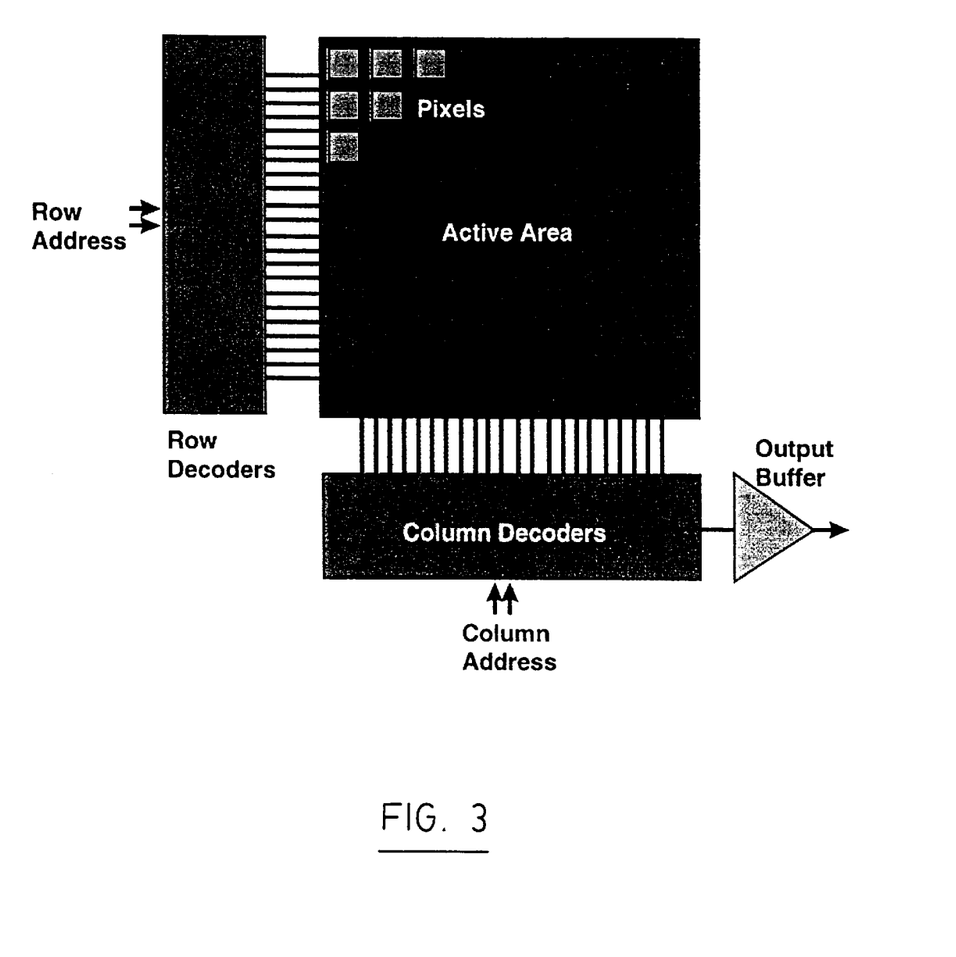
FIG. 3 is a schematic representation of the read-out integrated circuit for use with the micro-thermistor array according to a preferred embodiment of the present invention.

The complete fingerprint sensor comprises an array of these microthermistors (see FIG. 1). This array is fabricated on a substrate exhibiting a microthermistor read out circuit fabricated using standard IC fabrication processes, and which includes row decoders, column decoders, an active area and an output buffer, as is well known in the art (see FIG. 3). Holes in the passivation layer known as vias, provide access to the read out circuitry and permit electrical connection, and as such allow the connection of each microthermistor 13 to the underlying read out integrated circuit (see FIGS. 4, 5 and 6). The spacing between two adjacent microthermistor centres is preferably less than or equal to 50 $\mu$m, which corresponds to at least 500 dpi as specified by the Federal Bureau of Investigation. The array dimensions are at least 128 pixels×128 pixels in order to sense a substantial area of the fingerprint. A 256×256 array would even be preferable. The signals read from the microthermistors 13 provide a temperature mapping of the sensor array surface. This mapping is representative of the valleys and ridges pattern on the finger in contact with the sensor array.

Figure 4A:
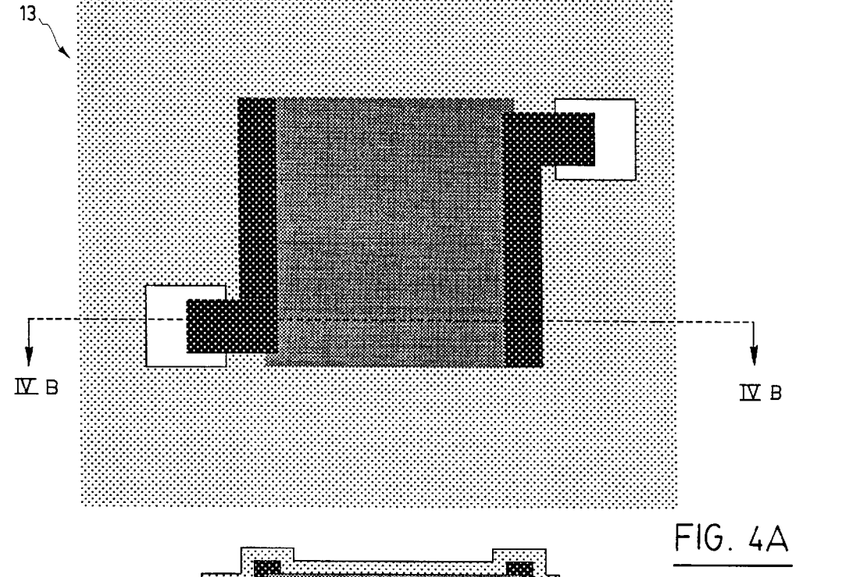
FIGS. 4a and 4b are schematic top and cross-sectional views, respectively, of a thermistor structure according to a first preferred embodiment of the invention.
Figure 4B:
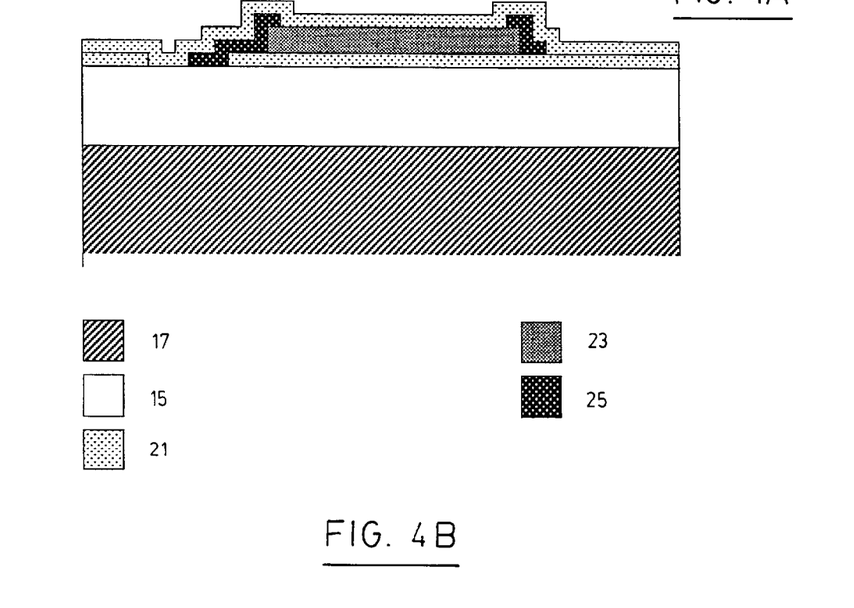

Practical implementation of the invention presented herein involves microthermistor fabrication. State-of-the-art microthermistors constituents of microbolometric detector arrays have been developed for IR imaging applications. Large arrays of 240×320 sensors have been demonstrated. One possible fabrication process for such sensor array has been described in U.S. Pat. Nos. 5,831,266 and 5,962,909, the contents of which are incorporated herein. The process there described is appropriate, at least in part, for fabricating the microthermistors required for the present invention. Typically, the microthermistors fabricated for IR imaging applications are suspended over the substrate, that is, there is an air gap between the sensor and the substrate supporting it. This makes these microthermistors particularly fragile and they would generally be destroyed if they would come in contact with a finger. Therefore, modifications to the basic fabrication process outlined in the above patents are required. First, the modified fabrication process must avoid the production of an air gap between the sensor and its supporting substrate. This will allow the microthermistors to be rugged enough to withstand repeated finger contacts. As long as this particular requirement is respected, the structure of the microthermistor array can vary depending on the acceptable sensor cross-talk and the detector sensitivity required for the application. The simplest possible structure is shown in FIG. 4. The microthermistor illustrated there is identified by reference numeral 13. It comprises a passivation layer 21 deposited on the read out circuit and patterned to provide access to the underlying integrated circuit 15. A sensitive layer 23 is deposited on this passivation layer 21 and patterned. Electrodes 25 connect the sensitive layer 23 to the underlying read out circuit 15. A final passivation layer 21 is deposited to complete the sensor. This structure is expected to be the one exhibiting the lowest sensitivity and highest cross-talk when compared to the other structures described below.

In the second possible structure, illustrated in FIG. 5 and referred to as 13'', the sensitive 23 and passivation layers 21 are deposited on a thermal insulation layer 27. The sensitive 23 and passivation 21 layers are patterned as for the previous structure. As in FIG. 4, electrodes 25 connect the sensitive layer 23 to the read out circuit 15. The insulation layer 27 is patterned to provide access and connection to the underlying read out circuitry 15. This structure is expected to perform better than the structure illustrated in FIG. 4.

Figure 6A:
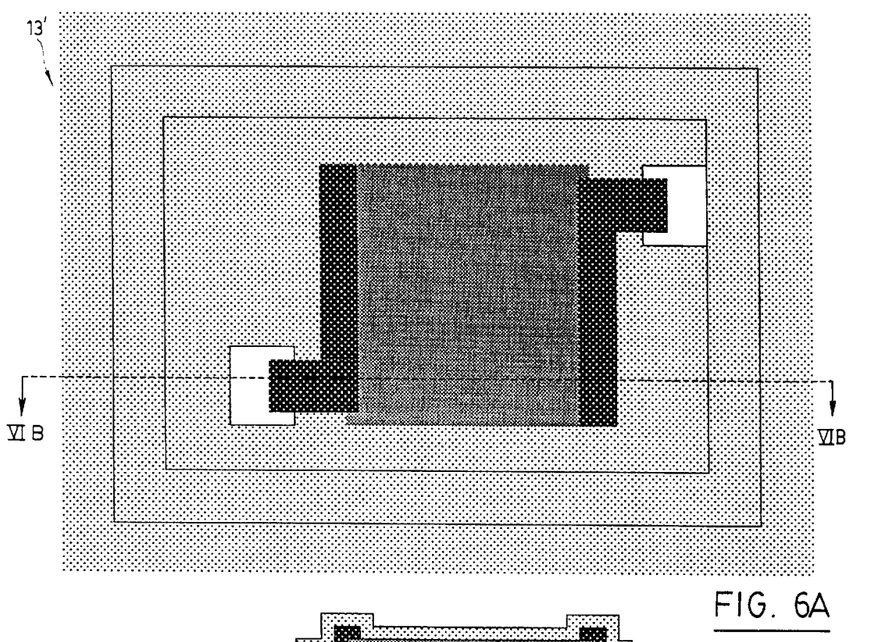
FIGS. 6a and 6b are schematic top and cross-sectional views, respectively, of a thermistor structure according to a third preferred embodiment of the invention.
Figure 6B:
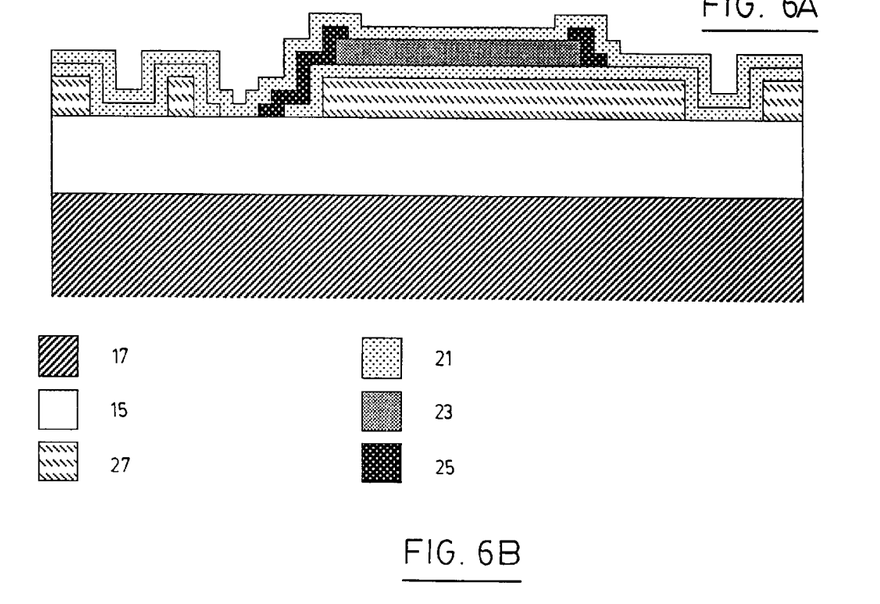

The third structure, illustrated in FIG. 6 and referred to as 13''', is like the second structure described above, but in this version, trenches separating the different sensors are also etched in the insulation layer. This structure is expected to demonstrate the highest sensitivity and lowest cross-talk when compared to the other structures described above.

Figure 7:
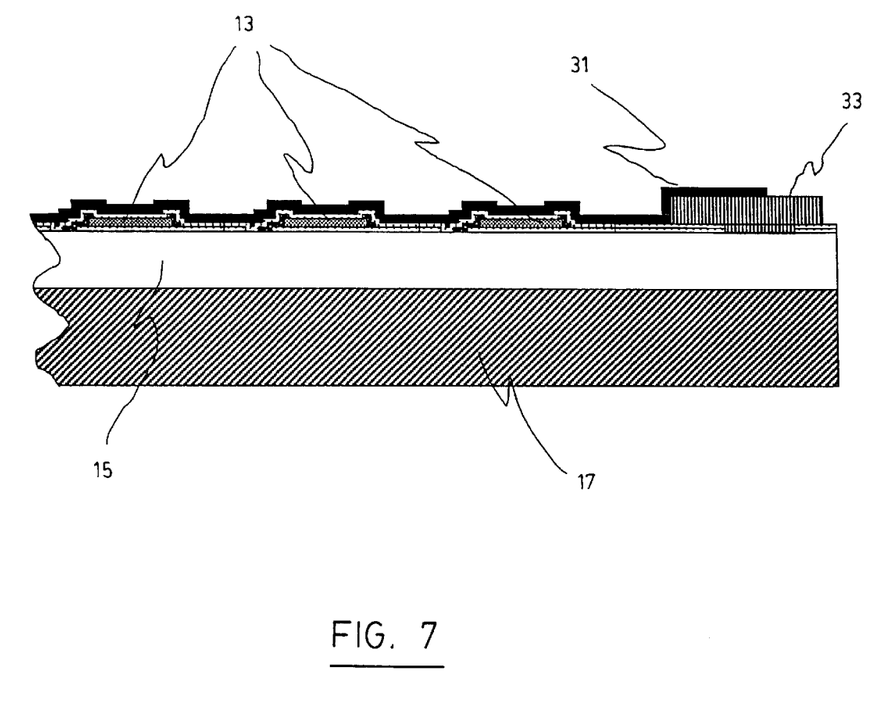
FIG. 7 is a cross-sectional view of a sensor, showing the metallic film.

A second modification to the basic microthermistor fabrication process is highly desirable to adapt these sensors 13 for fingerprint recording. Some additional provisions must be made in order to protect the sensors and the read out circuit from eventual electrostatic discharges generated by an incoming finger. This can be achieved by depositing a metallic layer 31 on the microthermistor array 11 as is illustrated in FIG. 7. This metallic layer must be connected to the underlying integrated circuit ground preferably through a bonding pad 33. It can be patterned to minimize the thermal conductivity between adjacent sensors or not, depending on the tolerance of the application on cross-talk. If the metallic material is well chosen (titanium, for example), this additional layer can also improve the durability of the microthermistors fabricated for fingerprint acquisition. The metallic layer protects the sensor against electrostatic discharges, as mentioned above, and repeated finger contacts.

The microthermistor based fingerprint sensor described herein presents highly desirable features for automated fingerprint acquisition. Its sensitivity can be very high if the sensitive layer material for the microthermistors is carefully selected. In particular, $VO_2$ or $VO_x$, are preferred candidates as they exhibit a high Temperature Coefficient of Resistivity (TCR). They would provide excellent sensitive material for thermistors aimed at fingerprint sensing applications.

The microthermistor based fingerprint sensor can exhibit very short response time and operate at high data acquisition rate of hundreds of kHz. High contrast fingerprint representation can be achieved due to the relatively high difference between the sensor array base temperature (typically room temperature) and the temperature of the finger under investigation.

The operation of the thermistor based fingerprint sensor does not require external heating of the sensors. Regarding this particular aspect, basic substrate temperature stabilization would be desirable but not absolutely necessary.

Temperature transients generated by sensor array pulse heating, virtual shutter or finger sweeping are not required either. Moreover, the thermistor based fingerprint sensor can be made quite insensitive to vibrations or pressure by selecting a thermistor sensitive layer material which does not exhibit important piezoelectric properties. Note that this is not the case for pyroelectric material which, typically, are also piezoelectric to some extent.

The overall fingerprint sensor size is small which is very convenient for a variety of applications. This small size is made possible due to the fact that the system's heart is an electronic chip of about 1 $cm^2$. Another advantage of the fingerprint sensor based on microthermistors is that the sensor structure allows for a monolithic fabrication process, which is not the case for the pyroelectric based fingerprint sensor. Finally, it is possible to take advantage, to a large extent, of the microbolometer and read out integrated circuit fabrication process already existing for infrared imaging applications. The read out circuit necessary for data acquisition from the thermistors is virtually the same as the one used for microbolometer arrays. The know-how developed in order to interface the microbolometers to the underlying read out circuit can be applied directly to the thermistor array fabrication. Finally, a large overlap exists between the bolometric detector array and the thermistor based fingerprint sensor fabrication steps. Only a few fabrication steps from the microbolometer fabrication process need to be modified in order to improve the sensor ruggedness and allow direct finger contact.

Although the present invention has been described by way of a preferred embodiment thereof, it should be understood that any modifications thereto will not depart from the scope of the invention as defined in the appended claims.

What is claimed is:

1. A fingerprint sensor for transforming the ridge and valley pattern of a finger, hereinafter referred to as a fingerprint, into an electronic output signal, comprising:
   (a) a microthermistor array for converting temperature variation into an electrical signal, said array being composed of a plurality of microthermistors, each of said thermistors being adapted to output an electrical signal proportional to a temperature variation;
   (b) a read-out integrated circuit operatively connected to said microthermistor array for receiving said electrical signal and converting it into an electronic output signal representative of the ridge and valley structure of a finger; and
   (c) a substrate for supporting said read-out integrated circuit and said microthermistor array.

2. A fingerprint sensor according to claim 1, wherein each of said thermistors comprises a pair of spaced apart electrodes, said electrodes being separated by a sensitive layer, each of said electrodes being in electrical contact with said read out circuit; said sensitive layer being placed on a passivation layer which is in direct contact with said read out circuit, said thermistor further comprising a top passivation layer.

3. A fingerprint sensor according to claim 1, wherein each of said thermistors comprises a pair of spaced apart electrodes, said electrodes being separated by a sensitive layer, each of said electrodes being in contact with said read out layer, said sensitive layer being placed on a passivation layer, said passivation layer being placed on a thermal insulation layer which is in direct contact with said read out circuit, said thermistor further comprising a top passivation layer.

4. A fingerprint sensor according to claim 1, wherein each of said thermistors comprises a pair of spaced apart electrodes, said electrodes being separated by a sensitive layer, each of said electrodes being in contact with said read out layer, said sensitive layer being placed on a passivation layer, said passivation layer being placed on a thermal insulation layer which is in direct contact with said read out circuit, said thermistor further comprising a top passivation layer, wherein said thermal insulation layer is etched away in a rectangular pattern within which said thermistor is located.

5. A fingerprint sensor according to claim 1, wherein adjacent thermistors are centre-to-centre separated by a distance of 50 μm or less.

6. A fingerprint sensor according to claim 2, wherein adjacent thermistors are centre-to-centre separated by a distance of 50 μm or less.

7. A fingerprint sensor according to claim 3, wherein adjacent thermistors are centre-to-centre separated by a distance of 50 μm or less.

8. A fingerprint sensor according to claim 4, wherein adjacent thermistors are centre-to-centre separated by a distance of 50 μm or less.

9. A fingerprint sensor according to claim 1, wherein said array of thermistors comprises at least 128×128 thermistors.

10. A fingerprint sensor according to claim 2, wherein said array of thermistors comprises at least 128×128 thermistors.

11. A fingerprint sensor according to claim 3, wherein said array of thermistors comprises at least 128×128 thermistors.

12. A fingerprint sensor according to claim 4, wherein said array of thermistors comprises at least 128×128 thermistors.

13. A fingerprint sensor according to claim 1, wherein said sensor further comprises a metallic topmost layer, said metallic topmost layer being connected to the ground of said read out circuit.

14. A fingerprint sensor according to claim 2, wherein said sensor further comprises a metallic topmost layer, said metallic topmost layer being connected to the ground of said read out circuit.

15. A fingerprint sensor according to claim 3, wherein said sensor further comprises a metallic topmost layer, said metallic topmost layer being connected to the ground of said read out circuit.

16. A fingerprint sensor according to claim 4, wherein said sensor further comprises a metallic topmost layer, said metallic topmost layer being connected to the ground of said read out circuit.

17. A fingerprint sensor according to claim 1, wherein said sensitive layer is made of $VO_x$.

18. A fingerprint sensor according to claim 2, wherein said sensitive layer is made of $VO_x$.

19. A fingerprint sensor according to claim 3, wherein said sensitive layer is made of $VO_x$.

20. A fingerprint sensor according to claim 4, wherein said sensitive layer is made of $VO_x$.

21. A fingerprint sensor according to claim 1, wherein said sensor is temperature stabilized.

* * * * *